A. LAUTZ.
STONE CUTTING MACHINE.
APPLICATION FILED JAN. 2, 1913.

1,097,034.

Patented May 19, 1914.

3 SHEETS—SHEET 1.

WITNESSES:
Walter H. Kelley
Bessie E. Dempsey

INVENTOR
Arthur Lautz
BY J. Wm. Ellis
ATTORNEY

A. LAUTZ.
STONE CUTTING MACHINE.
APPLICATION FILED JAN. 2, 1913.

1,097,034.

Patented May 19, 1914.
3 SHEETS—SHEET 2.

WITNESSES:

INVENTOR
Arthur Lautz
BY
J. W. M. Ellis
ATTORNEY

A. LAUTZ.
STONE CUTTING MACHINE.
APPLICATION FILED JAN. 2, 1913.

1,097,034.

Patented May 19, 1914.

3 SHEETS—SHEET 3.

WITNESSES:

INVENTOR
Arthur Lautz

BY

ATTORNEY

UNITED STATES PATENT OFFICE.

ARTHUR LAUTZ, OF BUFFALO, NEW YORK.

STONE-CUTTING MACHINE.

1,097,034.  Specification of Letters Patent.  Patented May 19, 1914.

Application filed January 2, 1913. Serial No. 739,659.

*To all whom it may concern:*

Be it known that I, ARTHUR LAUTZ, a citizen of the United States of America, and a resident of the city of Buffalo, county of Erie, and State of New York, have invented certain new and useful Improvements in Stone-Cutting Machines, of which the following is a full, clear, and exact description.

One of the principal objects of my invention has been to provide a machine which should accomplish the cutting of stone and similar work pieces in a very short time and one which shall be practically automatic in its operation.

Furthermore, I have sought to produce a machine which should be provided with a variable speed driving means, to provide means whereby the workmen may manually move the cutting wheel to its work and thus ascertain the proper working speed for the material being treated by the cutting wheel, after which the automatic driving means may be adjusted to such predetermined speed and thrown into operation.

Figure 1:
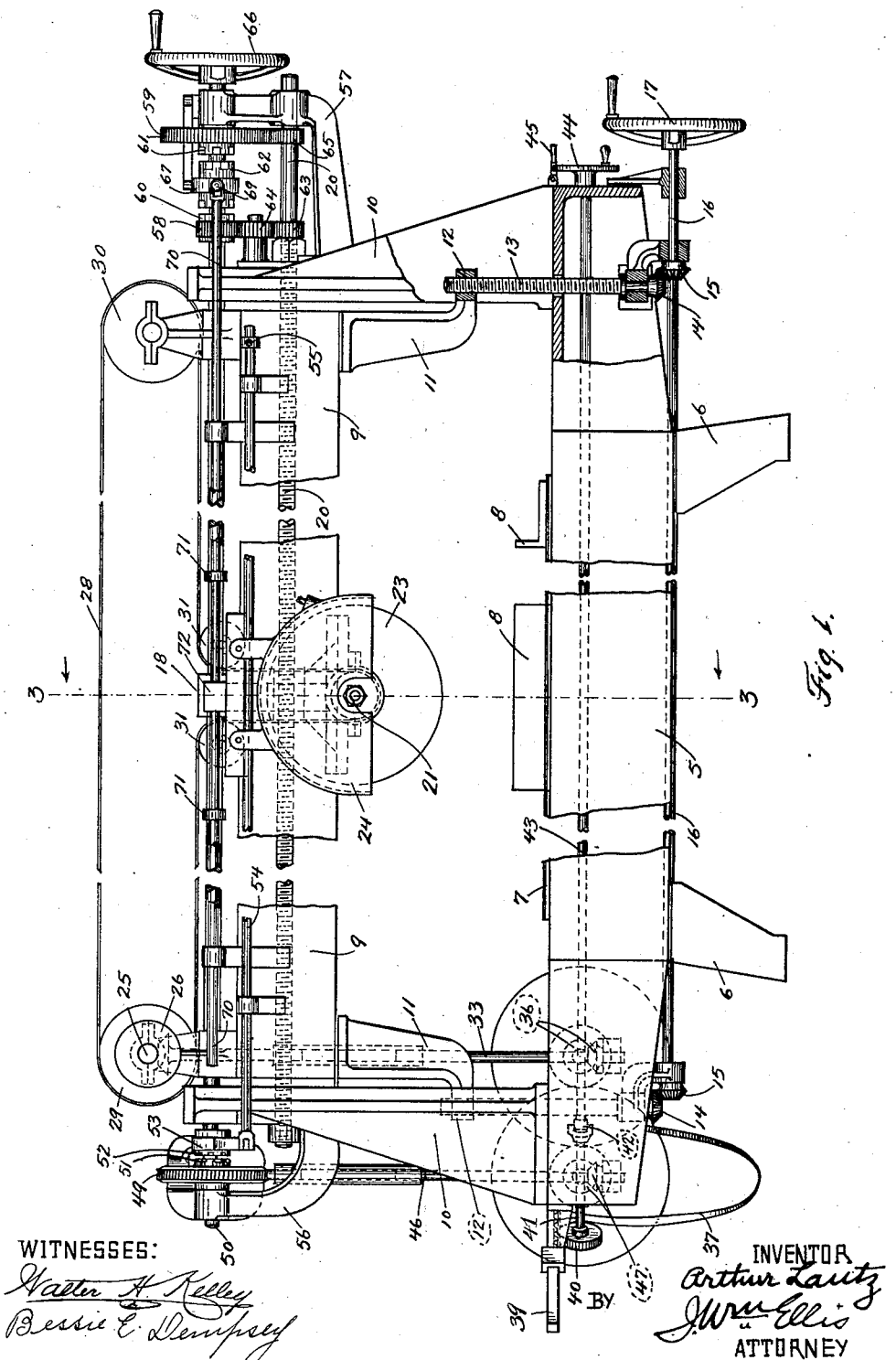
Figure 2:
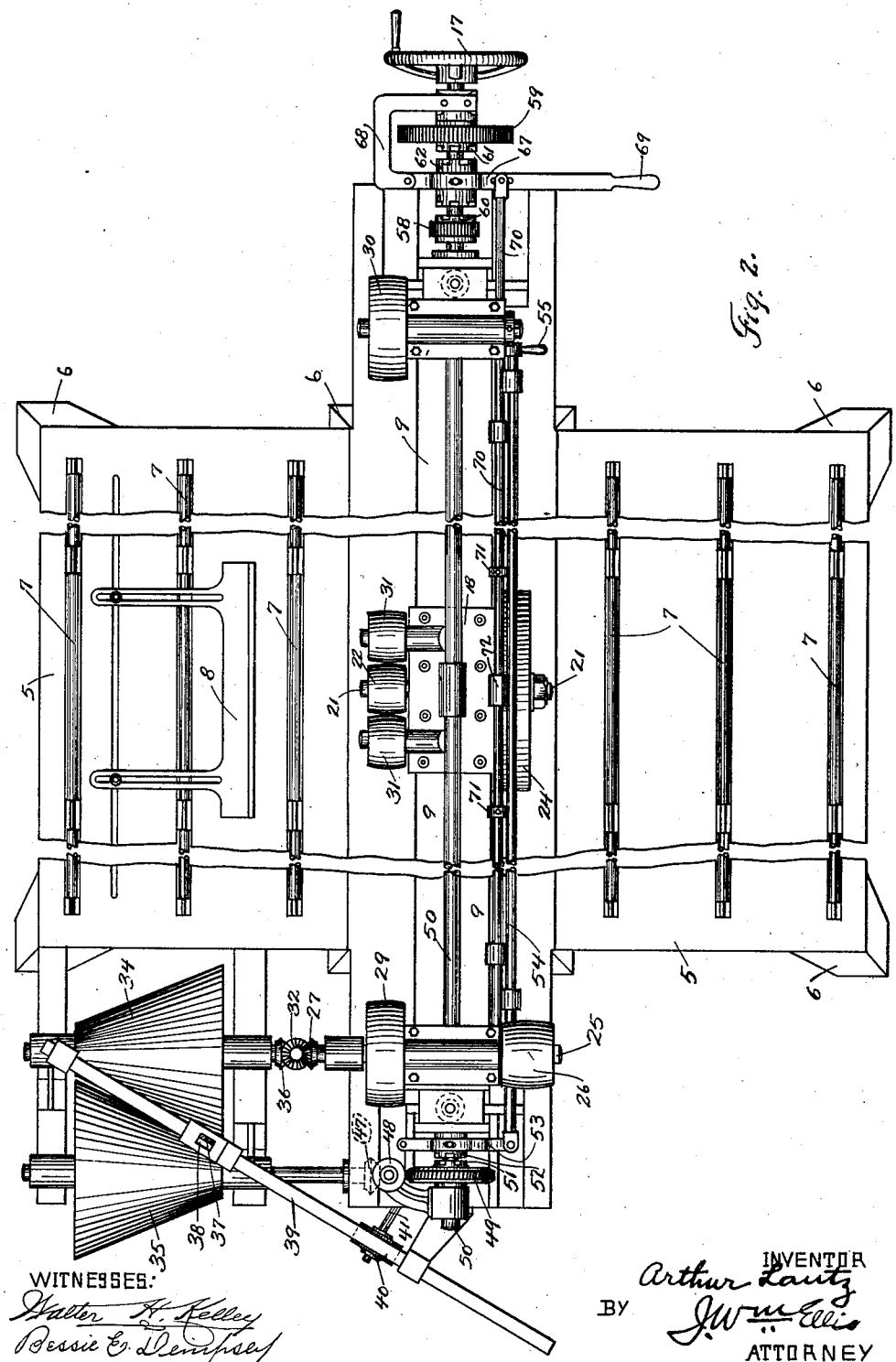
Figure 3:
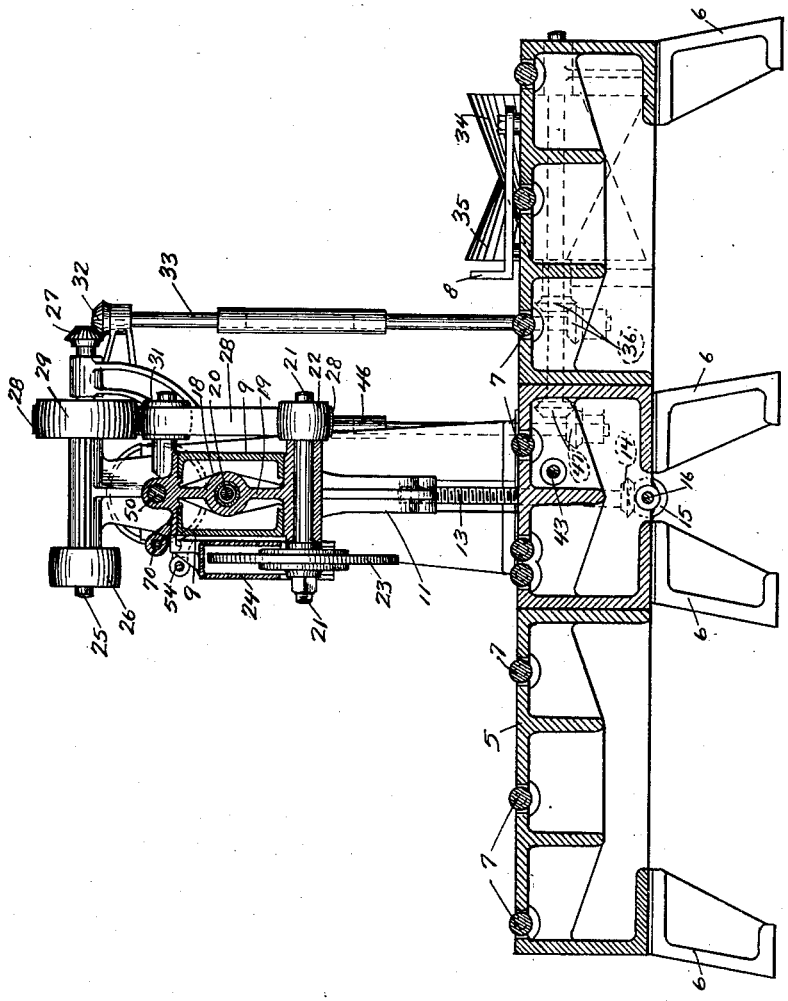

Reference is to be had to the accompanying drawings forming part of this specification in which like characters of reference indicate like parts throughout the several views of which:

Figure 1 is a side elevation of my machine with portions thereof broken away for clearness of illustration. Fig. 2 is a plan view of the same. Fig. 3 is a sectional elevation taken on line 3—3 of Fig. 1.

In the drawings, 5 represents the work table which is supported by suitable legs 6 and has provided in its upper surface a plurality of rollers 7. These rollers 7 project slightly above the upper surface of the work table, thus facilitating the easy handling on the table of the material to be cut (Fig. 3).

8 are suitable stops or gages, which are adjustably secured to the upper surfaces of the table.

9 are the carriage ways of my machine which are vertically slidable above the table and are disposed between standards 10 supported by the work table 5.

11 are brackets which support the ends of the carriage ways 9 and each of which has an outwardly extending arm 12 through which is provided a screw-threaded aperture. Vertical screws 13 are rotatably disposed in suitable bearings carried by the work table and have their upper ends disposed within the screw-threaded apertures formed in the brackets 11. To the lower end of each of the vertical screws 13 is secured a bevel gear 14 and meshing with these bevel gears are bevel gears 15. The gears 15 are rigidly mounted upon a shaft 16, rotatably carried by the machine. This shaft has at its outer end a hand wheel 17, by which the screws 13 may be revolved and the carriage ways raised or lowered as desired.

18 is the cutter carriage which is slidably disposed on the carriage ways 9. This carriage is preferably I-shaped and has the central web 19 disposed between the ways 9. In the center of the web 19 is provided a screw-threaded aperture through which the carriage screw 20 is adapted to pass, by which the said carriage is moved back and forth on the ways 9. Rotatably disposed in the lower part of the cutter carriage 18 is the cutter arbor 21, which is provided at one end with a drive pulley 22 and at the opposite end with a cutter wheel 23. This cutter wheel is preferably a wheel made from abrasive material and is protected by a suitable hood 24.

25 is the main drive shaft of my machine which is rotatably supported in suitable bearings carried at the rear end of the carriage guides 9 and provided with a suitable belt pulley 26 at one end and a bevel gear 27 at the opposite end.

28 is the cutter belt which passes over the pulley 29 secured to the shaft 25 and a pulley 30 rotatably supported at the opposite end of the carriage ways and thence over idlers 31 carried by the carriage and around the pulley 22 carried by the cutter arbor. Meshing with the bevel gear 27 is a bevel gear 32, secured to the upper end of a telescoping shaft 33. This shaft is supported at its upper end by a suitable bearing carried by the ways 9 and at its lower end by a suitable bearing carried by the work table.

34 and 35 are variable speed cone pulleys which are rotatably carried by the work table 5 at the rear of the machine. Connecting the shaft of the cone pulley 34 with the telescoped shaft 33 is a pair of bevel gears 36.

The cone pulleys 34 and 35 have their peripheries in close proximity to each other and a belt 37 is passed between the same. This belt is suitably supported and passes through a slot 38 formed in the reciprocating rod 39, suitably supported by the work table. This rod is provided, for a short distance on its under side with gear teeth, thus forming a rack with which is engageable a pinion 40. The pinion 40 is rigidly secured upon a shaft 41, which connects through the medium of a universal joint 42 with a shaft 43, extending to the front of the machine where it is provided with a notched disk 44. This disk is rigidly secured to the shaft and engageable with the notches provided therein is a latch 45 which securely holds the shaft 43 against rotation when in engagement with one of the notches formed in the periphery of the disk 44.

46 is a telescoping shaft which is vertically supported in suitable bearings and connected at its lower end with the shaft of the cone pulley 35 by a pair of bevel gears 47. At the upper end of the telescoping shaft 46 is secured a worm 48 which meshes with a worm gear 49, rotatably carried upon a feed shaft 50. The worm gear 49 is held against longitudinal movement upon the feed shaft 50 and is provided at one end of its hub with a clutch member 51.

52 is a co-acting clutch member which is non-rotatable and slidably mounted upon the feed shaft 50.

53 is a strap which has its inner end pivotally carried by the bearing bracket 56 and straddles the clutch member 52. An operating rod 54, slidably carried by the ways 9 is pivotally united at one end to the outer end of the strap 53 and is provided on its opposite end with an operating handle 55, by which the worm gear 49 may be thrown into engagement with the feed shaft 50.

The feed shaft 50 extends the length of the machine and across the top of the ways 9 and is rotatably disposed in suitable bearings carried by brackets 56 and 57 and by the cutter carriage 18. Rotatably carried by the feed shaft 50 near its forward end is the forward drive spur gear 58 and the reverse spur gear 59. These gears are spaced apart on the feed shaft and are prevented from axial movement thereon by any suitable means and each is provided with a clutch member 60 and 61 respectively.

62 is a double-ended clutch member which is slidable and non-rotatably mounted upon the feed shaft 50 and between the clutch members 60 and 61 of the gears 58 or 59 and is arranged to alternately connect the gear 58 and 59 with the feed shaft 50. The gear 58 drives the gear 63, rigidly secured on the carriage screw 20 through the medium of an idler gear 64. The gear 59 meshes with a spur gear 65 also carried by the screw 20.

66 is a hand wheel by which the feed shaft 50 and the connected parts may be manually operated. A clutch strap 67 is arranged over the double-ended clutch member 62 and has its inner end pivotally carried by the arm 68 and its outer end provided with an operating handle 69.

70 is a stop rod, slidably carried by the ways 9 and pivotally united at one end to the clutch strap 67. This rod 70 is provided with adjustable stops 71 which are disposed in the path of travel of a lug 72 carried by the carriage and by which the rod 70 will be moved longitudinally and thus disengage the double-ended clutch member 62 from engagement with either the co-acting clutch member 60 or 61.

When the machine is to be put into use, the work piece is placed upon the work table 5 and the cutter 23 adjusted to the proper elevation above the work table. This is accomplished by rotating the hand wheel 17 which, through the medium of the bevel gears 14 and 15 and screws 13 will raise or lower the brackets 11 upon which the ways are supported. When the proper height of the cutter has been determined, power is applied from any suitable source to the pulley 26, thus driving the cutter arbor 21, through the medium of the belt 28. The telescoping shafts 33 and 46, cone pulleys 34 and 35 and worm gear 49 will now be rotated, but as all the clutches are out of engagement, the feed shaft 50 and screw 20 will remain stationary. The cutter carriage 18 having been moved to the rear of the machine, the workman now moves the arm 69 and throws the double-ended clutch member 62 into engagement with the clutch member 60 on the forward drive gear 58 which will connect the feed shaft 50 with the screw 20, through the medium of the gears 63 and 64. The hand wheel 66 is now manually rotated in the proper direction and the cutter moved to its work and fed at a rate of travel which is determined by the operator as he moves the cutter 23 to its work. After the proper rate of travel has been determined, the rod 54 is actuated so that the clutch member 52 will be thrown into engagement with the clutch member 51 on the worm gear 49, thus coupling the said worm gear with the feed shaft 50 and thereby rotating the same by power. The latch 45 is now raised and the disk 44 is rotated so as to move the belt 37 to a position between the cone pulleys 34 and 35 which will cause the feed shaft 50 to rotate at the speed predetermined by the previous manual rotation of the wheel 66. The cutter will now be carried along through the work piece and its speed of travel may be increased or decreased as required while the machine is in operation. When the cutter has reached a predetermined point at the end of the cut in the work piece, the lug 72 provided on the cutter carriage 18 will strike one of the collars 71 and, through the medium of the rod 70 and strap 67, will throw the double-ended clutch member 62 out of engagement with the clutch member 60 on the forward drive gear 58. When the gear 58 is uncoupled from the feed shaft 50, the rotation of said gear is stopped and also the rotation of the screw 20, thereby automatically stopping the travel of the cutter carriage 18. The handle 69 is now pulled toward the front of the machine which causes the double-ended clutch member 62 to engage with the clutch member 61 provided on the reverse gear 59, thereby causing the said gear 59 to be coupled with the rotating feed shaft 50. The reverse gear 59 meshes directly with the gear 65 carried by the screw 20 and thus rotates the said screw in the opposite direction and at a higher rate of speed than it is rotated when the carriage is moving forwardly. As the screw is rotated in this direction the carriage will be rapidly moved to the opposite end of the machine where it will engage with the other collar 71 and move the clutch member 62 out of engagement with the clutch member 61 carried by the gear 59 and thus stop the travel of the carriage. The carriage is now ready to again move forwardly to its work in the manner hereinbefore described.

It will be seen that, after the correct rate of travel of the cutter carriage has been determined, the worm gear 49 is coupled with the feed shaft 50 and remains coupled during the time the machine is in use, the clutch member 62 being used to start and stop the machine in its forward and reverse motions.

Obviously, many modifications of the details herein shown and described may be made without departing from the spirit of my invention or the scope of the appended claims, and I do not wish to be limited to the exact embodiment herein shown and described.

Having thus described my invention, what I claim is:

1. A stone cutting machine comprising a work table, carriage ways adjustably supported above said table, a cutter carriage slidable on said ways, a cutter carried by said carriage, means for elevating said ways, means for driving said cutter, a feed shaft disposed above said ways, variable speed driving means between said cutter driving means and said feed shaft, clutch means connecting said feed shaft with said variable speed driving means, a feed screw disposed below said feed shaft and parallel therewith, said feed screw engaging said carriage, a hand wheel carried by said feed shaft and clutch and gear means connecting said feed shaft with said feed screw, whereby said carriage may be operated manually, or by power in either direction.

2. A stone cutting machine comprising a work table, carriage ways adjustably supported above said table, a cutter carriage slidable on said ways, a cutter carried by said carriage, means for elevating said ways, means for driving said cutter, a feed shaft disposed above said ways, variable speed driving means between said cutter driving means and said feed shaft, manual operating means connected to said feed shaft, clutch means connecting said feed shaft with said variable speed driving means, a feed screw disposed below said feed shaft and parallel therewith, said feed screw engaging said carriage, and clutch and gear means connecting said feed shaft with said feed screw, whereby said carriage may be operated manually or by power in either direction.

3. A stone cutting machine comprising a work table, carriage ways adjustably supported above said table, a cutter carriage slidable on said ways, a cutter carried by said carriage, means for elevating said ways, means for driving said cutter, a main power shaft carried by said ways, a variable speed drive carried by said table, means connecting said power shaft with said variable speed drive, means carried by said ways for actuating said carriage comprising a feed shaft carried by said ways, clutch means mounted on one end of said feed shaft, a telescoping shaft connecting said clutch means with said drive, a feed screw engageable with said carriage and clutch and gear means for connecting said feed shaft and said screw.

4. A stone cutting machine comprising a work table, carriage ways adjustably supported above said table, a cutter carriage slidable on said ways, a cutter carried by said carriage, means for elevating said ways, means for driving said cutter, a main power shaft carried by said ways, a variable speed drive carried by said table, means connecting said power shaft with said variable speed drive, means carried by said ways for actuating said carriage comprising a feed shaft carried by said ways, a worm gear rotatably mounted on one end of said shaft, a worm engageable with said worm gear, means connecting said drive with said worm, clutch means for coupling said worm gear on said feed shaft, a feed screw engageable with said carriage and means for connecting said feed screw with said feed shaft.

5. A stone cutting machine comprising a work table, carriage ways adjustably supported above said table, a cutter carriage slidable on said ways, a cutter carried by said carriage, means for elevating said ways, means for driving said cutter, a main power shaft carried by said ways, a variable speed drive carried by said table, means connecting said power shaft with said variable speed drive, means carried by said ways for actuating said carriage comprising a feed shaft carried by said ways, means for connecting said feed shaft with said variable speed drive, a feed screw engageable with said carriage, a forward drive gear and a reverse drive gear, each rotatably mounted on said feed shaft, an idler gear meshing with said forward drive gear, gears rigidly mounted on said feed screw and meshing with said reverse gear and said idler gear and clutch means for engaging either of said forward or reverse gears with said feed shaft.

6. A stone cutting machine comprising a work table, carriage ways adjustably supported above said table, a cutter carriage slidable on said ways, a cutter carried by said carriage, means for elevating said ways, means for driving said cutter, a main power shaft carried by said ways, variable speed drive carried by said table, a telescoping shaft connecting said power shaft with said variable speed drive, means carried by said ways for actuating said carriage comprising a feed shaft carried by said ways, a worm gear rotatably mounted on one end of said shaft, a worm engageable with said worm gear, a telescoping shaft connecting said drive with said worm, clutch means for coupling said worm gear on said feed shaft, a feed screw engageable with said carriage and means for connecting said feed screw with said feed shaft.

7. A stone cutting machine comprising a work table, carriage ways adjustably supported above said table, a cutter carriage slidable on said ways, a cutter carried by said carriage, means for elevating said ways, means for driving said cutter, a main power shaft carried by said ways, variable speed drive carried by said table, a telescoping shaft connecting said power shaft with said variable speed drive, means carried by said ways for actuating said carriage comprising a feed shaft carried by said ways, means for connecting said feed shaft with said variable speed drive, a feed screw engageable with said carriage, a forward drive gear and a reverse drive gear, each rotatably mounted on said feed shaft, an idler gear meshing with said forward drive gear, gears rigidly mounted on said feed screw and meshing with said reverse gear and said idler gear and clutch means for engaging either of said forward or reverse gears with said feed shaft.

8. A stone cutting machine comprising a work table, carriage ways adjustably supported above said table, a cutter carriage slidable on said ways, a cutter carried by said carriage, means for elevating said ways, means for driving said cutter, a feed shaft carried by said ways, a worm gear rotatably mounted on one end of said shaft, a worm engageable with said worm gear, a variable speed drive connected with a suitable source of power, a telescoping shaft connecting said drive with said worm, clutch means for coupling said worm gear on said feed shaft, a feed screw engageable with said carriage, a forward drive gear and a reverse drive gear, each rotatably mounted on said feed shaft, an idler gear meshing with said forward drive gear, gears rigidly mounted on said feed screw and meshing with said idler gear and reverse drive gear and clutch means for coupling either of said forward or reverse gears to said drive shaft.

In testimony whereof I have hereunto signed my name in the presence of two subscribing witnesses.

ARTHUR LAUTZ.

Witnesses:
   JOHN E. O'BRIEN,
   WALTER H. KELLEY.

---

Copies of this patent may be obtained for five cents each, by addressing the "Commissioner of Patents, Washington, D. C."